United States Patent [19]

Wells

[11] 4,203,636
[45] May 20, 1980

[54] ROCKABLE TV MOUNT

[76] Inventor: Theodore W. Wells, P.O. Box 8211, A/P Sta., San Francisco, Calif. 94128

[21] Appl. No.: 909,315

[22] Filed: May 24, 1978

[51] Int. Cl.² ............................................. A47B 81/06
[52] U.S. Cl. ................................. 312/7 TV; 312/7 R; 312/322; 358/254; 248/185
[58] Field of Search ............. 312/7R, 7 TV, 8, 322; 248/185; 358/254, 93; 5/62, 67, 68

[56] References Cited

U.S. PATENT DOCUMENTS

| | | | |
|---|---|---|---|
| 2,413,922 | 1/1947 | Jensen et al. | 312/7 TV |
| 2,571,903 | 10/1951 | Loewi et al. | 358/254 |
| 2,826,809 | 3/1958 | Lapastora | 248/185 |
| 3,034,152 | 5/1962 | Stryker | 5/67 |
| 3,072,738 | 1/1963 | Epps, Jr. et al. | 358/254 |
| 3,286,707 | 11/1966 | Shafer | 5/62 |
| 3,467,455 | 9/1969 | Caldemeyer | 312/7 R |
| 3,761,152 | 9/1973 | Cory | 312/7 TV |
| 3,813,491 | 5/1974 | Pennar | 358/254 |

OTHER PUBLICATIONS

Technical Disclosure Bulletin (IBM), vol. 18, No. 11 (Apr. 1976).

Primary Examiner—Victor N. Sakran
Attorney, Agent, or Firm—John L. McGannon

[57] ABSTRACT

A mount for a TV to position the same for movement about a horizontal axis to allow the viewing orientation of the picture tube of the TV to be changed. One embodiment of the mount utilizes a pair of spaced rings having bracket means to mount a TV therewithin. A fastener, such as a flexible belt, secures the TV to the bracket means. The rings are then mounted on rotatable shafts for rocking the same and thereby the TV about a horizontal axis. Other embodiments include a mount capable of being suspended from a ceiling, a mount for a TV console, and a mount movable over a floor.

19 Claims, 18 Drawing Figures

ROCKABLE TV MOUNT

This invention relates to improvements in the mounting of television receivers and, more particularly, to a mount for positioning such a receiver so that it can be rocked into any one of a number of angular orientations to permit viewing of the picture tube by a person in any one of a number of different viewing positions.

BACKGROUND OF THE INVENTION

As is commonly known all television receivers ordinarily have a cabinet which, when placed upon a horizontal supporting surface, such as a tabletop or the like, orients the picture tube so that the images on the picture tube are upright. Some attempts have been made to tilt the TV about a horizontal axis through the sides of the TV such as when the TV is mounted at a given height above the floor, such as near the ceiling, so that one resting or reclining in bed can look upwardly toward the ceiling and the picture tube will be at a downwardly inclined position permitting the viewing of the picture while sitting up in bed or lying on the back. In all of the foregoing situations, the person viewing the television screen must have his head substantially upright to assure the proper frame of reference in viewing the images on the picture tube. Otherwise, the viewer's frame of reference is distorted and the viewer cannot enjoy the TV program.

Many times, bed-ridden people must lie on their sides to alleviate a pain or other bodily discomfort. In doing so, they cannot easily move their heads to upright positions so as to be able to view a picture tube of a TV. Even when doing this, holding their head angularly disposed relative to the body causes cramps, aches and other discomforts which causes the viewers to limit their viewing time. A need, therefore, exists for structure for orienting a TV so that a person lying on his side can view a television screen yet the images will be upright to him and he can enjoy TV programs associated with the images to a much greater degree.

SUMMARY OF THE INVENTION

The present invention is directed to a rockable mount for a TV wherein the TV or its picture tube can be rotated from a normal, upright position to an angled position so that one reclining on the side can view the TV in the normal fashion, i.e., with the proper frame of reference. To this end, the invention utilizes structure for positioning a TV on a support so that the structure, when rotated relative to the support, causes the TV to be rocked into a position at which the orientation of the picture tube changes to accommodate a viewer lying on his side or in a position at which the normal position of the TV is inappropriate.

In several embodiments, such structure includes a pair of spaced rings having bracket means for mounting the TV therewithin. Hold-down means secures the TV to the rings so that the system formed by the rings and the TV is an integral unit. The rings rest on rotatable members coupled to a power device, such as a reversible motor, for rotating the members and thereby the rings and TV until the desired angular position of the picture tube of the TV is achieved. The bracket means on the rings is located such that the center of mass of the aforesaid system is approximately at the center of the circular portions of the rings. Thus, as the rings rotate, the system remains essentially stable at all times since the center of mass of the system does not change in position.

Various embodiments of the invention may be provided. For instance, one version of the invention can be provided for home use wherein the rings are merely placed on and removably supported by the bearings. Other embodiments include one supported from the ceiling of a room, another in which the rings are mounted in a TV console, and still another in which the TV can be moved from place to place.

The primary object of this invention is to provide an improved mount for a TV wherein the TV can be rocked in either direction about a horizontal axis so as to orient its picture tube to accommodate the frame of reference of a position suitable for a person reclining on the side so as to render the mount suitable for persons who are bed-ridden or the like.

Another object of this invention is to provide a TV mount of the type described wherein the support includes a pair of spaced rings having bracket means thereon for securing a TV within the confines of the rings and means to rotate the rings, so that a TV carried thereby will be rotatable into any one of a number of angular positions yet the system of the rings and TV will be essentially stable at all times.

A further object of this invention is to provide a mount of the aforesaid character wherein the mount can be suspended from a ceiling, placed in a console or moved from place to place yet the stability of the mount will be maintained regardless of the particular application thereof.

Other objects of this invention will become apparent as the following specification progresses, reference being had to the accompanying drawings for illustrations of several embodiments of the invention.

Figure 1:
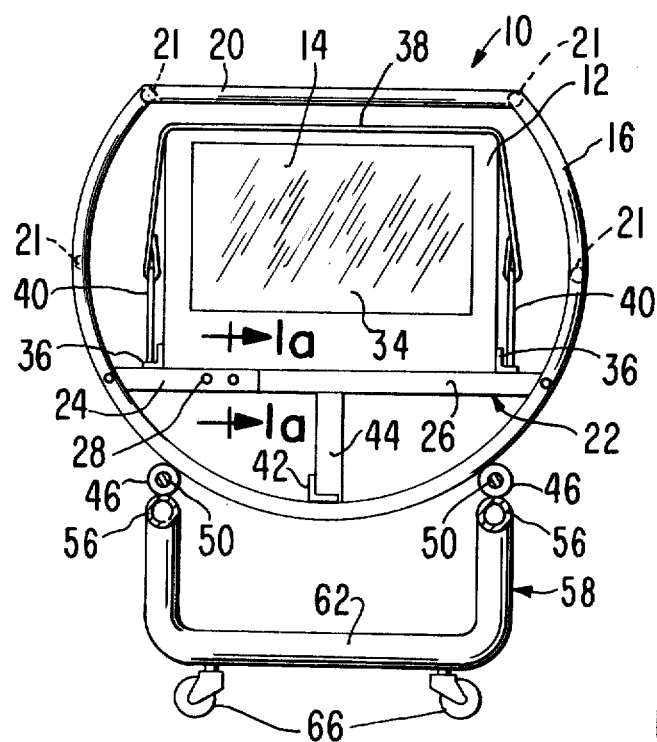
FIG. 1 is a front elevational view of a first embodiment of the TV mount of this invention.
Figure 2:
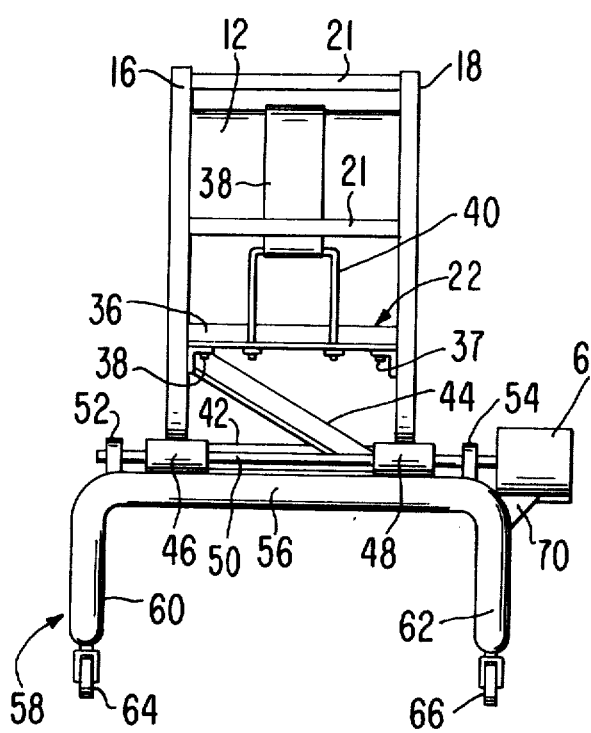
FIG. 2 is a side elevational view of the mount of FIG. 1.
Figure 3:
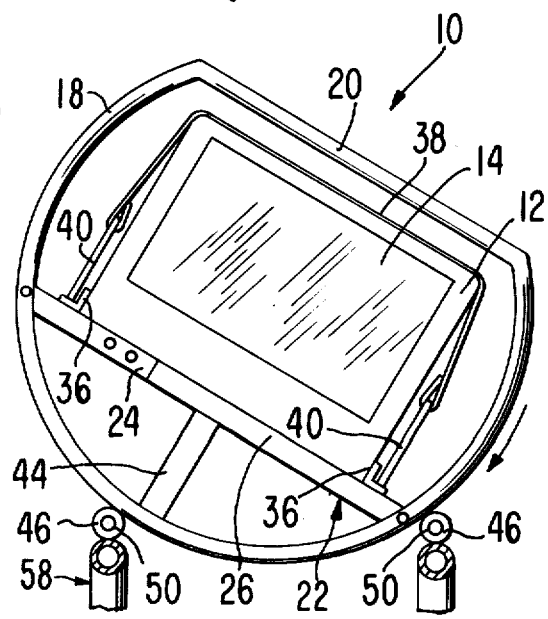
FIG. 3 is a view similar to FIG. 1 but showing the mount and the TV in an inclined position.

The first embodiment of the rockable TV mount of this invention is broadly denoted by the numeral 10 and is shown in FIGS. 1-3. Mount 10 is adapted to mount a TV receiver 12 (hereinafter referred to as a TV) either in a position such that images on its picture tube 14 can be viewed in upright orientations as shown in FIG. 1 or in a position such that the picture tube images can be viewed in an angled or inclined orientation as shown in FIG. 3. Thus, a reclining viewer can view the picture tube either on his back or lying on his side and still have the proper frame of reference for viewing the picture tube in either instance.

Mount 10 includes a pair of spaced rings 16 and 18 which are continuous and are circular throughout a major portion thereof, each ring having a straight, normally upper segment 20 coupled to the upper ends of the circular portion thereof as shown in FIG. 1. The rings are spaced apart preferably by a distance equal to the thickness of the TV as shown in FIG. 2. While this is not critical, it is preferred inasmuch as such an arrangement gives optimum stability to the system. Preferably, each ring is of tubular steel and has a wall thickness of about 0.065 inch. A number of spaced dowels 21 may be provided to add rigidity to the rings.

Figure 1A:
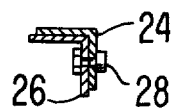
FIG. 1a is an enlarged cross-sectional view taken along line 1a–1a of FIG. 1.

Each ring has a first mounting bracket 22 thereon which spans the distance between the opposed sides of the ring as shown in FIG. 1. Each bracket 22 includes a pair of transversely L-shaped segments 24 and 26 which overlap each other and are interconnected by spaced fasteners 28 as shown in FIG. 1a. Segments 24 and 26 are provided with a plurality of holes therethrough so that the length of bracket 22 can be adjusted as desired.

Figure 2A:
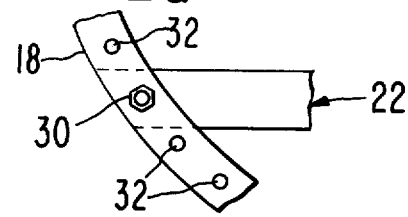
FIG. 2a is an enlarged, fragmentary rear elevational view of the ring of the mount.

The ends of each bracket 22 are secured by fasteners 30 to the corresponding ring on the surface thereof facing the other ring as shown in FIG. 2a. The fastening positions of fasteners 30 can be adjusted by virtue of the fact that the rings have a plurality of holes 32 so that the height of each bracket 22 can be adjusted as desired. Generally, brackets 22 will be at the same height relative to the lowest parts of the rings. The adjustment is such that the location of each bracket 22 is positioned to assure that the center of mass of TV 12 is substantially at the diametral center of the circular portions of rings 16 and 18. Typically, the center of mass of the TV is in the neightborhood of, for example, a point 34 which is below the center of the TV picture tube yet substantially midway between its sides. The reason for this is that the relatively heavy chassis of the TV is quite low with respect to the center of the picture tube.

Brackets 22 are interconnected by a pair of L-shaped second brackets 36 whose vertical flanges provide guides for positioning the TV on brackets 22. Second brackets 36 are secured by suitable fasteners 38 (FIG. 2) to brackets 22 and the brackets are provided with spaced holes for receiving fasteners 37 so that the positions of brackets 36 can be adjusted along the length of brackets 22. This feature allows brackets 36 to accommodate TV housings of different sizes.

To hold TV 12 on brackets 22, a fastener, such as a flexible belt 38 having the width shown in FIG. 2 is provided. If a belt is used, it is coupled at its ends to a pair or inverted U-shaped members 40 whose lower ends are secured in any suitable manner to brackets 36. Typically, the lower ends of members 40 are threaded and pass through holed in brackets 36 so that take-up nuts on the lower ends of the members can be tightened to thereby provide tension for the belt. This causes the TV to be securely fastened to the brackets. In the alternative TV receiver 12 and the TV receivers used with other embodiments of the present invention can be made with one or more nuts or stub bolts for attachment to brackets coupled with the rings, whereby the TV receiver is secured to the rings without the need for belts or bands such as belt 38.

To further stabilize the system, a first, lower brace 42 spans the distance between and is interconnected to the lower parts of rings 16 and 18. A second, inclined brace 44 spans the distance between ring 18 near its connection with brace 42 and bracket 22 of ring 16. Both braces 42 and 44 are transversely L-shaped and are secured in any suitable manner by fasteners to the rings and the bracket.

Rings 16 and 18 are removably supported on bushings 46 and 48 rigid to shafts 50 rotatably carried by bearings 52 and 54 on the upper spaced, horizontal stretches 56 of a base 58 having a U-shaped front portion 60 and a U-shaped rear portion 62. Portions 60 and 62 are provided with casters 64 and 66 so that base 58 can be easily rolled over the floor. One of the shafts 50 has a motor 68 coupled thereto for rotating the same, the motor being carried in any suitable manner, such as by a bracket 70 to rear U-shaped portion 62 as shown in FIG. 2.

In use, mount 10 is initially assembled by placing brackets 22 at the desired heights on respective rings 16 and 18. Then, braces 42 and 44 are coupled as shown in FIG. 2. Then, the TV is placed in the rings and on brackets 22 as the rings are supported on bushings 46 and 48. Then, the TV is centered between the sides of the rings so that the center of mass of the TV is essentially at the center of the circular portions of the rings. After the TV is centered, brackets 36 are put into place, thereby fixing the lateral position of the TV along segments 22. Following this, belt 38 is connected by members 40 to brackets 36 and the belt is placed under tension. When this is completed, the mount is ready to be used.

A reversing remote control switch (not shown) is used to actuate motor 68, the latter being reversible. When it is desired, for instance, to rotate the TV in a clockwise sense (when viewing FIG. 1), the switch is actuated to cause the motor to be energized and to drive the shaft 50 connected thereto in a counterclockwise sense, causing rings 16 and 18 to be driven by bushings 46 and 48, which functionally engage the rings, in a clockwise sense. The angle through which the TV is driven will be determined in accordance with the desires of the viewer. When the desired angle is reached, such as the angle of FIG. 3, the switch is deactuated, whereby the motor is deenergized and the TV remains at the desired inclination. In such inclination, the system remains stable because there has been substantially no change in the static characteristics of the system because the rings have merely rotated about the center of mass of the system comprised of the TV, the rings and the brackets. Thus, regarless of the orientation of the TV, the center of mass of the system passes downwardly substantially centrally between the sides 56 of base 58, thereby keeping the system stable at all times. To return the TV to its normal upright position, the motor is reversed by actuating the switch once again.

Figure 4:
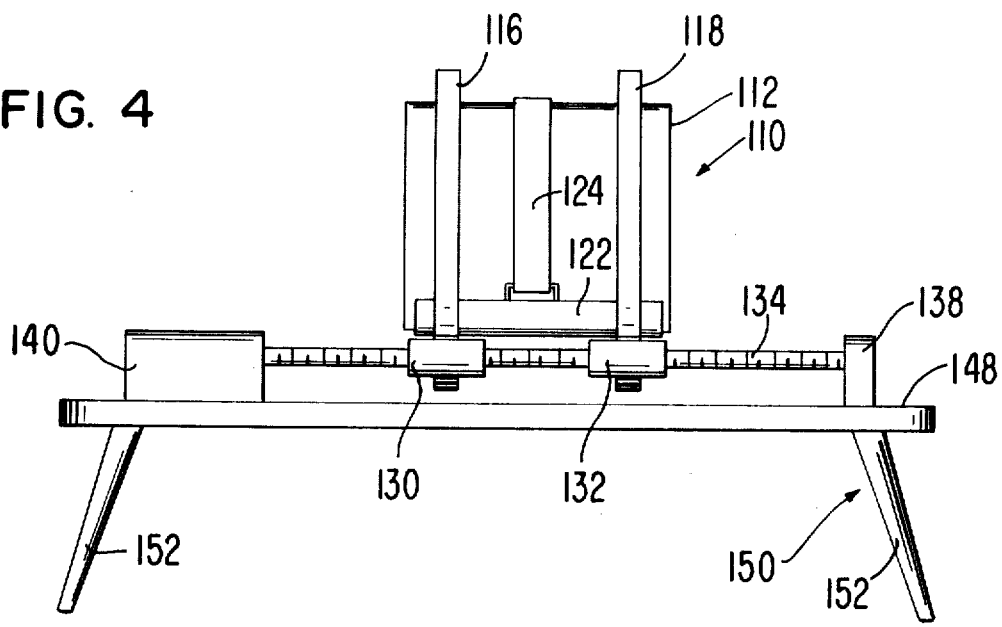
FIG. 4 is a side elevational view of a second embodiment of the mount.
Figure 5:
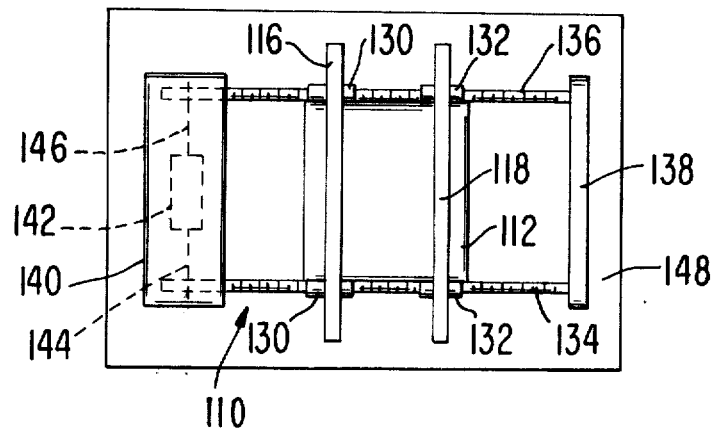
FIG. 5 is a top plan view of the mount of FIG. 4.
Figure 6:
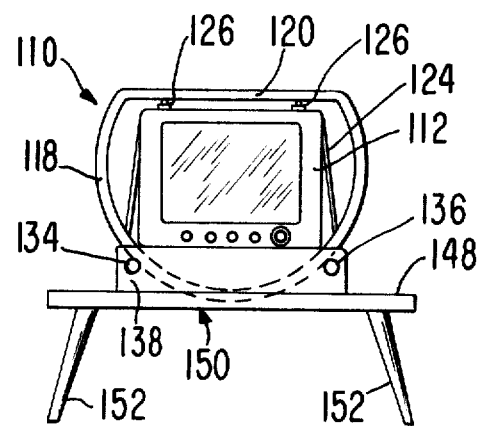
FIG. 6 is a front elevational view of the mount of FIGS. 4 and 5.

FIGS. 4, 5 and 6 show another embodiment of the mount, which embodiment is denoted by the numeral 110. Mount 110 includes a pair of spaced rings 116 and 118 of the same material as rings 16 and 18. Rings 116 and 118 are substantially semi-circular and have a flat top bar 120 interconnecting the upper ends of each of the rings themselves. A TV is mounted on brackets 122 which are fixedly secured such as by welding to respective rings 116 and 118. A belt 124 is used to secure the TV 112 to brackets 122. Also, spacers 126 which are adjustable in length are used to span the distance between the straight, upper bar 120 of each of rings 116 and 118 and the upper surface of the housing of TV 112 to rigidify the system.

Rings 116 and 118 are mounted on bushings 130 and 132 carried by horizontal shafts 134 and 136 whose ends are carried by a first support 138 and a second support 140, support 140 comprising a housing for containing a reversible drive motor 142 coupled by links 144 and 146 to the respective ends of screws 134 and 136. Supports 138 and 140 are mounted on the upper surface 148 of a table 150 having legs 152 for supporting the table on a floor.

In use, the brackets 122 are coupled to rings 116 and 118 so as to span a distance therebetween. Then, TV 112 is placed on the brackets and belt 124 is tied down at its ends in any suitable manner to brackets 122. Spacers 126 are then moved into place, rigidifying the connection between bars 120 and the upper surface of the TV housing.

The rings are then placed on bushings 130 and 132 and the system is ready for operation. By operating motor 142 with a remote control switch, rings 116 and 118 can be caused to rotate in either direction, so that the picture tube of the TV can be oriented to suit the desires of the viewer.

Figure 7:
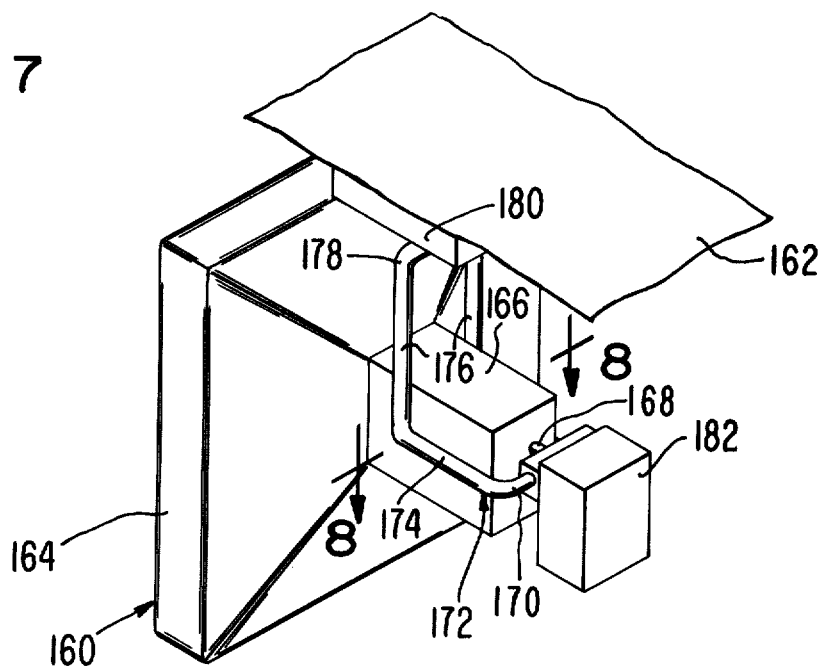
FIG. 7 is a perspective view of another mount for suspending a TV picture tube from a ceiling.
Figure 8:
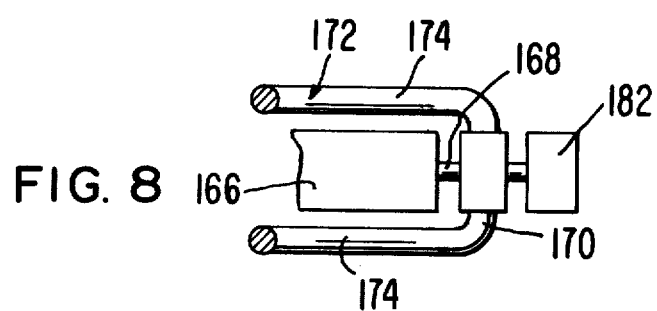
FIG. 8 is a cross-sectional view taken along line 8—8 of FIG. 7.

FIGS. 7 and 8 show the way in which a TV picture tube 160 can be mounted from a ceiling 162 for rotation about a horizontal axis through the picture tube itself. The picture tube is provided with a front portion 164 and a tubular rear portion 166, portion 166 being mounted by a shaft 168 on the rear crosspiece 170 of a fixed bracket 172 having a pair of rear horizontal sides 174, a pair of front vertical sides 176, and an upper crosspiece 178 secured by a mounting member 180 to the lower surface of ceiling 162. A reversible motor 182 carried by crosspiece 170 is operable to rotate shaft 168 relative to bracket 172 and thereby to rotate picture tube 160 relative to the ceiling. The length of the bracket is such that the picture tube can be rotated easily without engaging the ceiling. Also, the size of rear portion 166 of the picture tube is such as to allow the portion to rotate between rear sides 174 without engaging the same.

Figure 9:
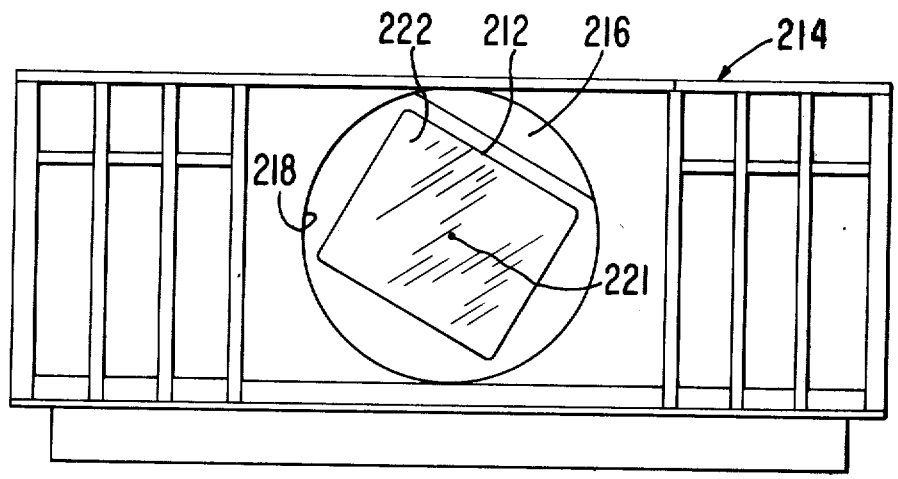
FIG. 9 is a front elevational view of a rockable TV in a console.
Figure 10:
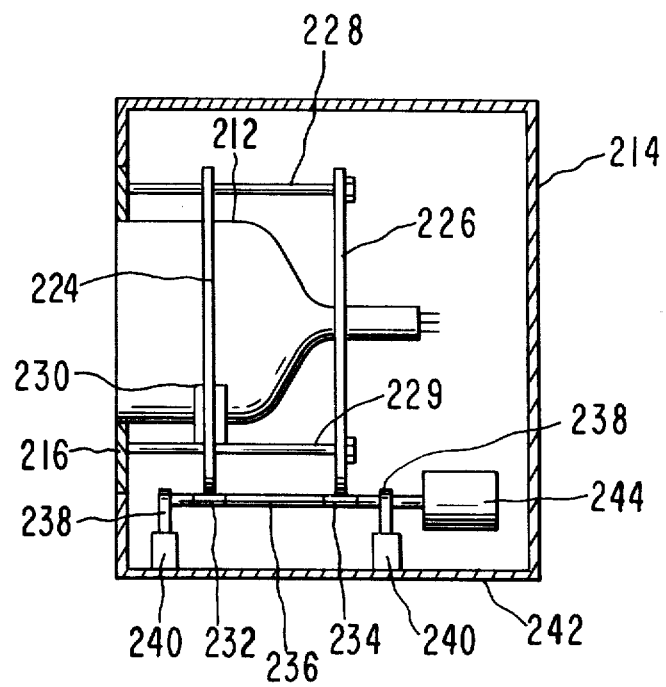
FIG. 10 is a vertical section through the embodiment of FIG. 9.

FIGS. 9 and 10 show a TV console 214 having a picture tube 212 mounted in a cut-out portion of a rotatable disk 216 in the circular hole 218 of the housing of the console. The disk is mounted for rotation about a horizontal axis 221 through the picture tube 222 by a pair of spaced rings 224 and 226 which are spaced apart and interconnected by a pair of spaced upper rigid fasteners 228 and a pair of spaced, lower, rigid fasteners 229. Disk 216 is coupled to the front ends of fasteners 228 and 229. The picture tube is supported on a pair of spaced brackets 230 which are secured to the sides of ring 224.

Rings 224 and 226 rest on bushings 232 and 234 secured to a pair of spaced, horizontal shafts 236 mounted in respective bearings 238 supported on blocks 240 carried at the bottom 242 of console 214. A reversible motor 244 coupled to one of shafts 236 rotates the latter to, in turn, rotate the two rings and thereby the picture tube and disk. Operation of motor 244 is by a switch remote from the console.

Figure 11:
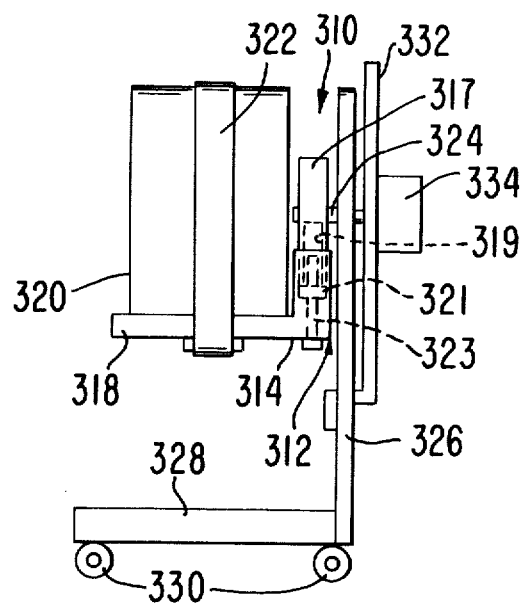
FIG. 11 is a side elevational view of another embodiment of the mount.
Figure 12:
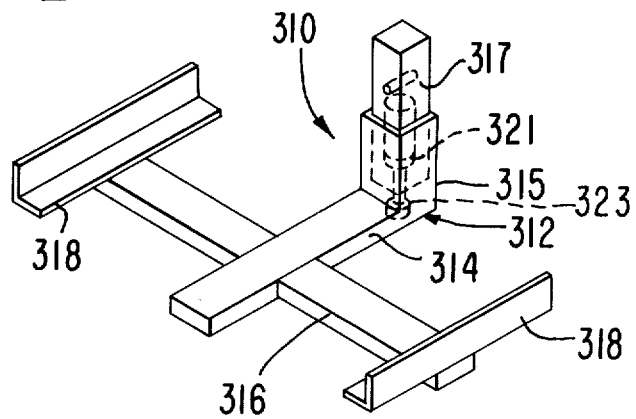
FIG. 12 is a perspective view of a portion of the mount of FIG. 11.
Figure 13:
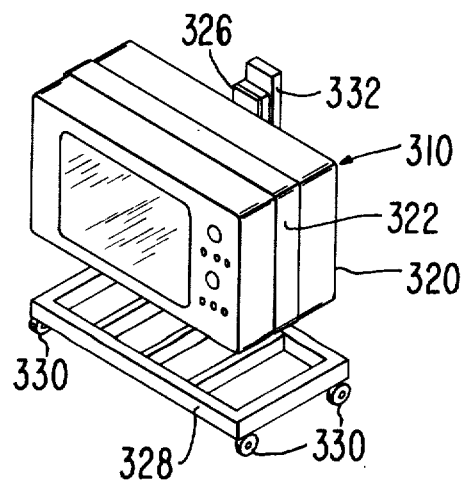
FIG. 13 is a perspective view of the mount of FIG. 11.

FIGS. 11, 12 and 13 illustrate a further embodiment of the mount which is denoted by the numeral 310. It comprises a bracket 312 (FIG. 12) having an L-shaped central segment 314, a flat, straight, lower segment 316, and a pair of L-shaped sides 318 connected to the ends of segment 316 and between which a TV 320 is adapted to be disposed. A flexible belt 322 is wrapped around the TV and is secured at its end in any suitable manner to brackets 312 near the ends of lower segment 316.

Bracket 312 has a vertical tubular part 315 secured to the rear end of central segment 314 and a post 317 is shiftably received in part 315 for up and down movement relative thereto. Post 317 has a bore 319 extending thereinto from its lower end, and a nut 321 is rigidly secured to the lower end of post 317 for threadably receiving a screw 323 rotatably carried by part 315. Thus, post 317 is adjustably carried by part 315.

A vertical mounting bar 326 is secured to a base 328 on rollers 330. A rear bracket 332 mounts a reversible motor 334 thereon, the motor having a rotatable drive shaft 324 coupled to post 317. The center of mass of the system is between wheels 330 and remains between the wheels as the TV is rotated or rocked under the influence of motor 334. Adjustment of post 317 relative to post 315 may be useful to assure that the center of mass remains between wheels 330. A remote control switch coupled to the motor operated the same so that the motor will cause the TV to move to an inclined position about a horizontal axis through shaft 324.

Figure 14:
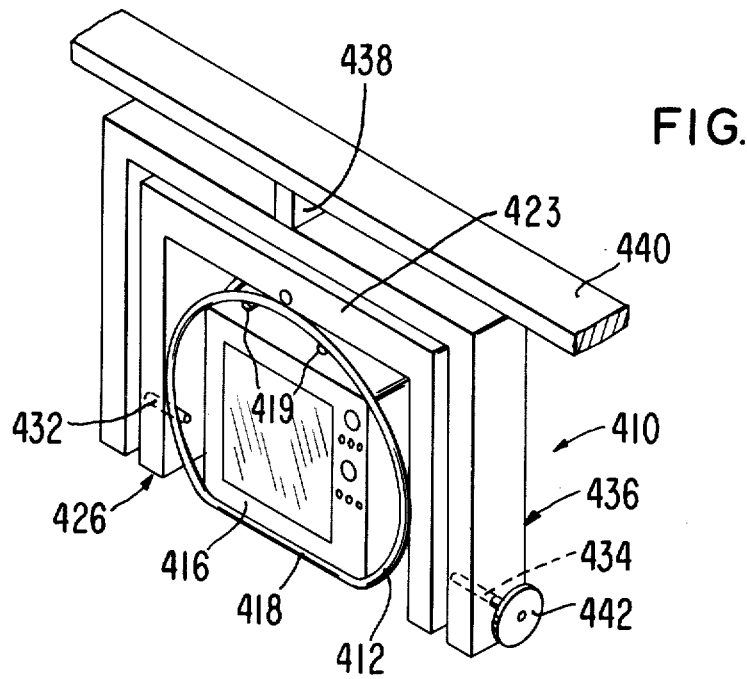
FIG. 14 is still another embodiment of the mount of the type for suspending a TV from the ceiling.
Figure 15:
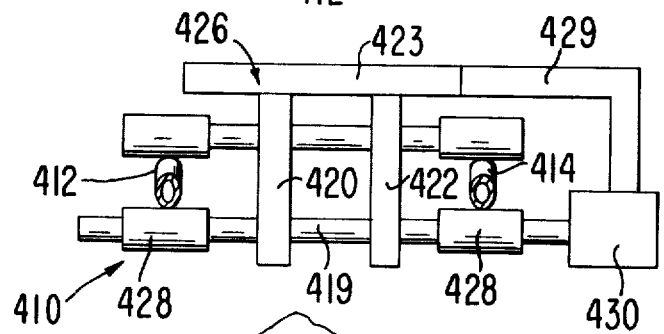
FIG. 15 is an enlarged, fragmentary, cross-sectional view of the mount of FIG. 14.

FIGS. 14 and 15 illustrate another embodiment of a mount for suspension from a ceiling, the mount being denoted by the numeral 410. This embodiment includes a pair of spaced rings 412 and 414 which mount a TV 416 in place on the straight, lower portion 418 of each of the rings. Bracket means (not shown) can be used to seat the TV in the rings. Also, a belt can be used to secure the TV to the bracket means.

The rings are mounted on a pair of spaced bearings 420 and 422 which depend from and are secured to the upper member 423 of an inverted U-shaped member 426. The rings engage a pair of bushings 428 on shafts 419, and a reversible motor 430 is carried by an arm 429 on member 426 and coupled to one of the shafts for rotating the same and thereby rings 412 and 414 relative to member 426.

Member 426 is rockably coupled by a pair of horizontal stub shafts 432 and 434 to a second inverted U-shaped member 436 secured by a block 438 to a ceiling joist 440. Member 436 is therefore rigid to the ceiling yet shafts 432 and 434 allow member 426 to pivot about a horizontal axis through such shafts. An adjustment knob 442 is provided on each of the shafts 432 and 434, respectively, to adjust the position of mount 426 relative to mount 436. This feature allows the TV set to be tilted downwardly yet the orientation of the TV can be changed by actuating motor 430 by a remote switch.

Figure 16:
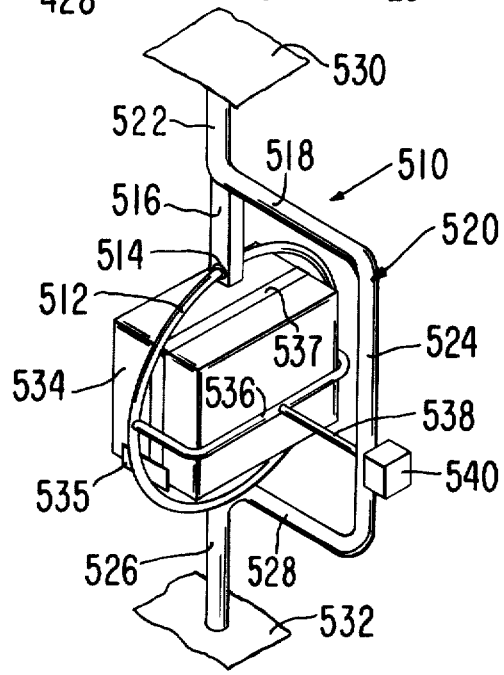
FIG. 16 is still another embodiment of the mount of this invention.

FIG. 16 illustrates another embodiment of the mount which is denoted by the numeral 510. It comprises a single ring 512 which is rotatable through a bushing 514 in a vertical extension 516 coupled to the upper horizontal portion 518 of a fixed post 520 having an upper, vertical portion 522, a central, vertical portion 524, and a lower, vertical portion 526. A lower horizontal portion 528 interconnects vertical portions 524 and 526.

Vertical portion 522 is secured to the ceiling 530 of the room and portion 526 is secured to the floor 532 of the room.

A TV 534 is disposed on spaced brackets 535 within ring 512, and a U-shaped member 536 provides a back support for the TV. A belt 537 passing over the top and down the sides of the TV is coupled to the brackets and operates to secure the TV thereto.

A shaft 538 extends rearwardly from member 536 and passes through central vertical portion 524. A reversible motor 540 is coupled to the rear end of shaft 538 and is coupled to central vertical portion 524. Thus, when motor 540 is actuated by a remote control switch, ring 512 is rotated relative to post 520, causing TV 534 to rotate about the axis of shaft 538.

I claim:

1. A mount for a television receiver having a viewing screen comprising: means adapted to be coupled to a television receiver for mounting the same for movement about a generally horizontal axis, said mounting means comprising base structure having means for positioning the television receiver thereon, means coupled with said positioning means for securing the television receiver thereto to prevent movement of the television receiver relative to said base structure, and means coupled with the base structure for supporting the same for rotation about a horizontal axis extending generally perpendicularly to the plane of the viewing screen of the television receiver when the latter is secured to the positioning means, whereby said base structure can be rotated about said axis to cause the viewing screen of the television receiver carried thereby to be tilted.

2. A mount as set forth in claim 1, wherein said base structure comprises a ring.

3. A mount as set forth in claim 1, wherein said base structure includes a pair of spaced rings, said positioning means spanning the distance between said rings, said securing means including a flexible band between the rings.

4. A mount as set forth in claim 1, wherein said base structure comprises a ring, said supporting means including a support adjacent to the upper extremity of said ring and coupled thereto to suspend the same.

5. A mount as set forth in claim 1, wherein said television receiver includes a picture tube, said base structure including a pair of spaced rings, said supporting means including a console housing having an opening through one face thereof and a member for receiving the front end of the picture tube of said television receiver, said member being secured to and being spaced from said rings and being rotatable therewith, the member being disposed in the opening of said housing.

6. A mount for a television receiver having a picture tube with a viewing screen comprising: a pair of spaced members, each member having a generally curved portion; means carried by the members for mounting a television receiver in an operative position therebetween; means coupled with said mounting means for releasably securing a television receiver thereto; means coupled with said members for supporting the curved portions thereof for rotation about a generally horizontal axis extending generally perpendicularly to the plane of the viewing screen of the television receiver when the latter is in said operative position; and means coupled with the members for rotating the same about said axis to cause the picture tube of a television receiver carried thereby to be tilted.

7. A mount as set forth in claim 6, wherein said member comprises a ring, the curved portion being circular, said axis being generally coincident with the central axis of the curved portion.

8. A mount as set forth in claim 6, wherein said mounting means is disposed to position said axis substantially at the center of mass of the television receiver when the latter is disposed on said mounting means.

9. A mount as set forth in claim 6, wherein said mounting means is adjustable in size to accommodate television receivers of different sizes.

10. A mount as set forth in claim 6, wherein said securing means comprises a flexible strap, and means for adjustably securing the ends of the strap to said mounting means, the strap adapted to extend across the top and the sides of a television receiver to hold the latter on said mounting means.

11. A mount as set forth in claim 6, wherein said supporting means comprises a pair of shafts, means mounting the shafts for rotation about generally horizontal, parallel axes, and power means coupled with one of the shafts for rotating the same and thereby said members.

12. A mount as set forth in claim 11, wherein said shaft mounting means comprises a base having bearing means for mounting the shafts for rotation about respective horizontal axis.

13. A mount as set forth in claim 6, wherein said supporting means includes a pair of spaced, parallel, generaly horizontal shafts, a support above the members, means mounting the shafts on the support to cause the members to depend from the shafts.

14. A mount as set forth in claim 13, wherein said support comprises an inverted U-shaped frame having said shafts coupled thereto, a pair of spaced, generally vertical posts, and means pivotally connecting the lower ends of said frame to the lower ends of said posts.

15. A mount as set forth in claim 6, wherein said supporting means comprises a console housing having an opening therein, said housing having a disk rotatable in the opening and having a central hole for receiving the picture tube of a television receiver, said disk being secured to said members and being spaced therefrom so that the disk rotates with said members.

16. A mount as set forth in claim 6, wherein each member comprises a continuous ring, each ring having a circular lower part defining said curved portion, and a straight part interconnecting opposed upper ends of the circular part, said mounting means comprising an adjustable, elongated element for each ring, respectively, each element having a pair of interconnected, adjustable side channel members, proximal ends of the side channel members being adjustably interconnected, the outer ends of the side channel members being adjustably coupled to the circular inner periphery of the corresponding circular part, and a pair of end channel members spanning the distance between and adjustably connected to respective elements.

17. A mount as set forth in claim 6, wherein said securing means comprises a flexible strap adapted to be disposed across the top of and down the sides of a television receiver in said operational position, and a pair of fasteners for securing the ends of the belt to said mounting means to place the strap under tension.

18. A mount as set forth in claim 17, wherein said fasteners comprise U-bolts having the bight thereof at the upper end thereof, the sides of the bolts passing through said mounting means.

19. A mount as set forth in claim 1, wherein said base structure includes a bracket having an L-shaped central segment and a pair of spaced sides defining said positioning means, said securing means including a flexible belt, said supporting means including a vertical mounting bar, said central segment having an adjustable vertical part secured to said mounting bar.

* * * * *